(12) United States Patent
Schutzendorf et al.

(10) Patent No.: US 8,128,103 B1
(45) Date of Patent: Mar. 6, 2012

(54) DEPLOYABLE SIDE SEAT FOR A BABY STROLLER

(75) Inventors: Marie Schutzendorf, San Francisco, CA (US); Corbett Griffith, San Francisco, CA (US)

(73) Assignee: Marie Schutzendorf, San Francisco, CA (US)

( * ) Notice: Subject to any disclaimer, the term of this patent is extended or adjusted under 35 U.S.C. 154(b) by 396 days.

(21) Appl. No.: 12/319,921

(22) Filed: Jan. 13, 2009

(51) Int. Cl.
*B62D 39/00* (2006.01)
*B62B 7/14* (2006.01)
*B62B 9/28* (2006.01)
*A47C 15/00* (2006.01)
*A47D 1/10* (2006.01)

(52) U.S. Cl. ............ 280/33.993; 280/643; 280/648; 280/47.25; 280/47.38; 297/234; 297/235; 297/248; 297/129; 297/134; 297/255; 297/257

(58) Field of Classification Search ............ 280/33.993, 280/642, 643, 647, 648, 649, 650, 657, 658, 280/47.25, 47.38, 304.1; 297/234, 235, 248, 297/14, 217.7, 129, 255, 256.16, 232, 257, 297/112, 130, 134
See application file for complete search history.

(56) References Cited

U.S. PATENT DOCUMENTS

| | | | | |
|---|---|---|---|---|
| 122,730 | A * | 1/1872 | Mealia | 297/234 |
| 937,625 | A * | 10/1909 | Mead | 297/241 |
| 1,212,221 | A | 1/1917 | Hobgood | |
| 2,836,224 | A * | 5/1958 | Hicks | 297/241 |
| 3,000,645 | A * | 9/1961 | Schmidt | 280/39 |
| 4,288,124 | A | 9/1981 | Hamilton | |
| 4,779,883 | A | 10/1988 | Paduano et al. | |
| 4,805,938 | A * | 2/1989 | Redmond et al. | 280/47.35 |
| 4,863,217 | A * | 9/1989 | Fountain | 297/241 |
| 5,312,122 | A * | 5/1994 | Doty | 280/33.992 |
| 5,622,375 | A | 4/1997 | Fairclough | |
| 5,653,460 | A * | 8/1997 | Fogarty | 280/642 |
| 5,704,627 | A * | 1/1998 | Davis et al. | 280/304.1 |
| 5,848,797 | A * | 12/1998 | Paez | 280/33.993 |
| 6,378,892 | B1 | 4/2002 | Hsia | |
| 6,530,591 | B2 | 3/2003 | Huang | |
| 6,746,079 | B2 * | 6/2004 | Cabedo-Deslierres | 297/250.1 |
| 6,851,693 | B2 * | 2/2005 | Haeggberg | 280/204 |
| 7,226,059 | B1 * | 6/2007 | Samuels | 280/33.992 |
| 7,481,439 | B2 * | 1/2009 | Thompson | 280/33.991 |
| 7,597,332 | B2 * | 10/2009 | Thompson | 280/47.38 |
| 7,677,585 | B2 * | 3/2010 | Rohl | 280/203 |
| 2007/0114738 | A1 * | 5/2007 | Jones et al. | 280/32.7 |

FOREIGN PATENT DOCUMENTS

JP 2005349996 12/2005

* cited by examiner

*Primary Examiner* — J. Allen Shriver, II
*Assistant Examiner* — John R Olszewski
(74) *Attorney, Agent, or Firm* — Thomas M. Freiburger

(57) ABSTRACT

An optionally deployable side seat for a baby stroller, to seat a second child, is secured by hand-operated connectors to nearly any baby or child stroller, without tools. The side seat faces to the side of the stroller and has a deployed position in which two wheels mounted in tandem on the side seat frame contact the pavement. For stowing the side seat remains on the stroller, and two quick-release lockable joints, in the position of arms on the side seat, are released and raised upwardly, which folds the seat bottom up against the seat back and raises up a lower frame portion that supports the wheels.

14 Claims, 11 Drawing Sheets

DEPLOYABLE SIDE SEAT FOR A BABY STROLLER

BACKGROUND OF THE INVENTION

This invention concerns baby strollers, and in particular an auxiliary, detachable, deployable side seat for accommodating a second child on a baby stroller.

Baby strollers have appeared in a number of different configurations. In recent years the great majority have been fold-up strollers, in a variety of mechanical arrangements. Often the parent pushing the stroller has a second young child along, and if this second child tires of walking, an additional seat on the stroller would be very useful. However, this is difficult to provide on a foldable stroller, typically light in weight and not with a sufficiently sturdy frame to support a second seat for a usually heavier second child. A number of child strollers, however, have included permanent seats for two or more children, especially infants. Some have had the seats in tandem and some side by side.

The following patents and applications show different approaches to providing an auxiliary second seat or a standing platform, usually for a child, on a baby stroller or other pushed wheeled device: international pub. Nos. WO 2005/105546 and WO 2003/020568, U.S. Pat. Nos. 6,746,079, 6,530,591, 6,378,892, 5,622,375, 4,779,883, 4,288,124, 3,000,645, 1,212,221, U.S. application pub. No. US 2007/01146738, and Japan pub. No. JP2005349996.

Of the above patents and applications, WO 2005/105546 shows a deployable auxiliary side seat for a folding-type baby stroller, secured to the side of the baby stroller, with the child to be facing forward and beside the infant in the stroller, and with a single wheel. The auxiliary seat was designed to be attached to several different models of strollers. However, the means of attachment to the stroller and the single wheel seemed to render that device less stable than desired according to the present invention.

U.S. Pat. No. 6,746,079 shows a folding seat attachable to a luggage cart, such as an airport luggage cart. The seat faces to the side, but it is designed to be deployed as a stationary seat, not one for carrying a rider.

The invention described below provides an easily attached, optionally deployable side seat for a stroller, particularly of the folding type, such that the stroller with the side seat is stable and easily operated, while being compactly retained against the side of the stroller in a stowed configuration.

SUMMARY OF THE INVENTION

Pursuant to the invention, an optionally deployable side seat for a baby stroller, to seat a second child, is easily secured by hand-operated connectors to nearly any baby or child stroller. The side seat faces to the side of the stroller and has a deployed position in which a wheel or preferably two wheels mounted in tandem on the side seat frame contact the pavement. The second child sits at right angles to the first child. For stowing the side seat remains on the stroller, and two quick-release lockable joints, in the position of arms on the side seat, are released and raised upwardly, which folds the seat bottom up against the seat back and raises up a lower frame portion that supports the wheels.

The hand-operated connectors are of a special design, with preferably three connectors extending back from the rear side of the side seat frame. Each of these is operable by a lever, without tools, to grip onto the tubing members of the stroller. The connectors are angularly adjustable as to orientation, as well as affording some rotational adjustment, so as to be attachable to stroller frame members of different configurations and orientations. Round, square or other shapes of stroller frame tubing can be gripped by the connectors.

The side seat when deployed has its wheels in contact with the pavement, i.e. at the same level as wheels of the stroller. The side seat frame has a plurality of horizontal pivot axes for stowing and deploying the seat. In a preferred embodiment the seat bottom frame pivots back against the seat back frame for stowage. The wheel or wheels are secured to a U-shaped frame member that itself pivots on a horizontal axis from the seat bottom frame and which extends obliquely above and back from the seat bottom frame a short distance, to a locking pivot joint. The locking pivot joint further is connected to a short linkage arm, at each side, this arm being pivotally connected on another horizontal axis to the seat back frame. When the seat is to be stowed, the two locking joints are released and swung upwardly, which not only pivots the seat bottom upwardly and back against the seat back but also swings the U-shaped bottom frame portion, with the wheels, upwardly and against the seat back and bottom, for compact stowage alongside the stroller.

It is therefore among the objects of the invention to provide an improved auxiliary seat for a baby stroller, one that is easily attached to nearly any baby stroller, orients the second child to the side, and which is easily deployed, stable in service, and easily stowed. These and other objects, advantages and features of the invention will be apparent from the following description of a preferred embodiment, considered along with the accompanying drawings.

DESCRIPTION OF PREFERRED EMBODIMENTS

Figure 1:
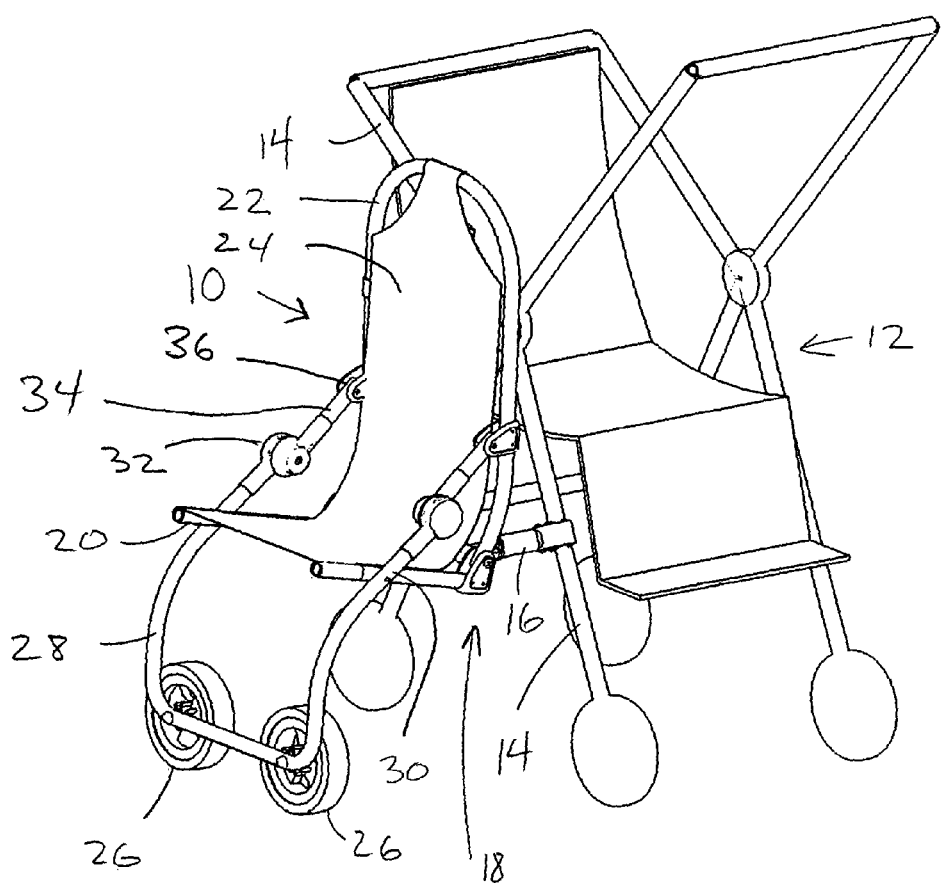
FIG. 1 is a perspective view showing a side-facing auxiliary child seat of the invention, connected to a baby stroller, depicted schematically.

The drawings show an auxiliary, optionally deployable second-child seat 10 of the invention, secured to a baby stroller shown schematically at 12. The stroller 12 typically is a collapsible, fold-up stroller, and in this case a stroller is schematically indicated as one for infants, wherein the infant sits or reclines facing rearwardly, toward the person pushing the stroller. In FIG. 1 the schematic indication of the stroller 12 does not include the typical series of joints and collapsible struts which enable the stroller to be folded up to a compact configuration, and in fact the invention applies to a stroller whether of the permanently erected type or the collapsible fold-up type. It could even be attached to a double stroller.

The side-facing child seat 10, shown in fully deployed position, is secured to portions of the frame 14 of the stroller 12 by connectors 16, explained in greater detail below. The auxiliary seat has its own frame 18, including a seat bottom frame 20 and a seat back frame 22. These support a seat and back, preferably of flexible material, and which may be unitary, as shown at 24. The seat 10 has at least one wheel, preferably a pair of wheels 26 arranged in tandem as shown. These are supported on a lower frame portion 28, which may be generally U-shaped as shown (preferably a warped U shape), being pivotally connected to the seat bottom frame at 30 and extending up to a pair of lockable joints 32, which are located generally in the position of armrests for the seat and which retain the lower portion of the frame in the deployed position shown in FIG. 1. Above the lockable joints 32 at each side is a short linkage arm 34 which extends up to a pivot connection 36 with the seat back frame, as illustrated.

Figure 2:
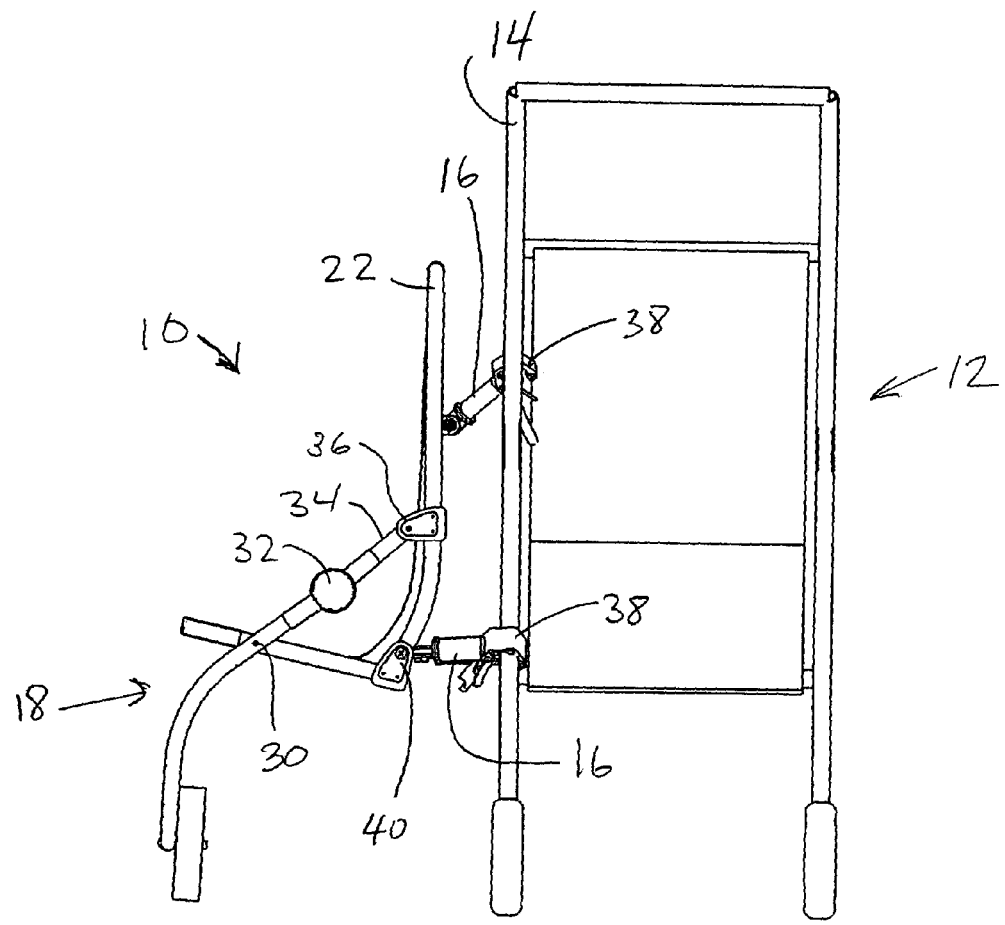
FIG. 2 is an elevation view showing the stroller from the front side, with the auxiliary child seat attached.

FIG. 2, showing the baby stroller 12 from a front end elevation view, illustrates the side-facing auxiliary seat 10 in profile. As seen in this view, the stroller connectors 16, of which there are preferably three, e.g. two extending from the lower end of the seat frame 18 and one from an upper portion at one side of the seat back frame 22, are shown gripping the tubular frame members of the main stroller frame 14. These tubular frame members may have a cross section round, square or otherwise, and the term "tubular" is to be broadly understood. The connectors 16, which may be permanently fixed to the second-child seat frame 18 or which may optionally be adjustable as to positions on that frame, are angularly adjustable as to orientation extending back from the seat frame 18. These connectors 16 have gripping heads or stroller attachment or gripping ends 38 which preferably are further adjustable rotationally with respect to the opposite end of the connector 16. This allows nearly any stroller to be firmly and stably engaged with the connectors 16.

Figure 3:
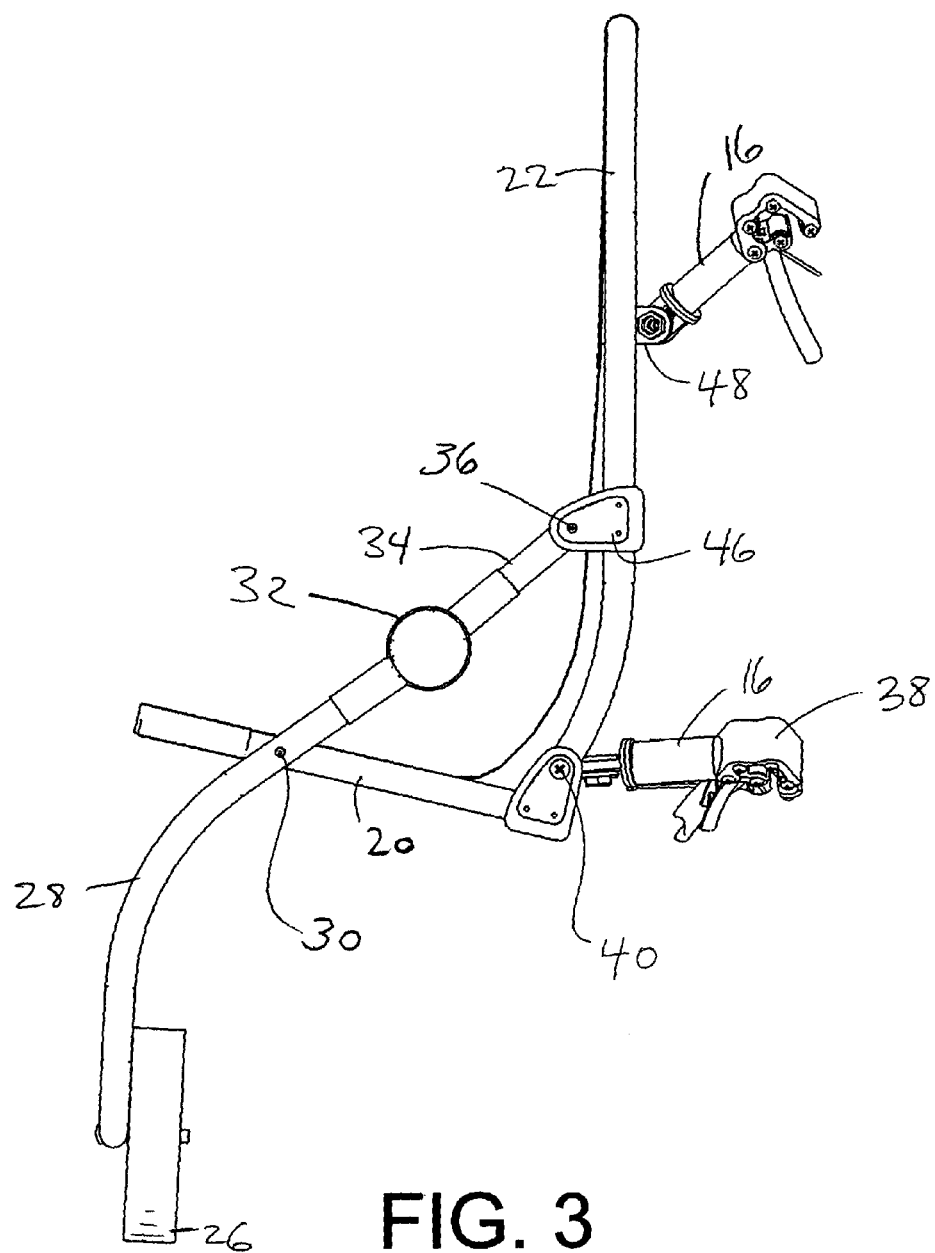
FIG. 3 is an elevation view showing the auxiliary seat in deployed position and in profile, without a stroller attached.
Figure 4:
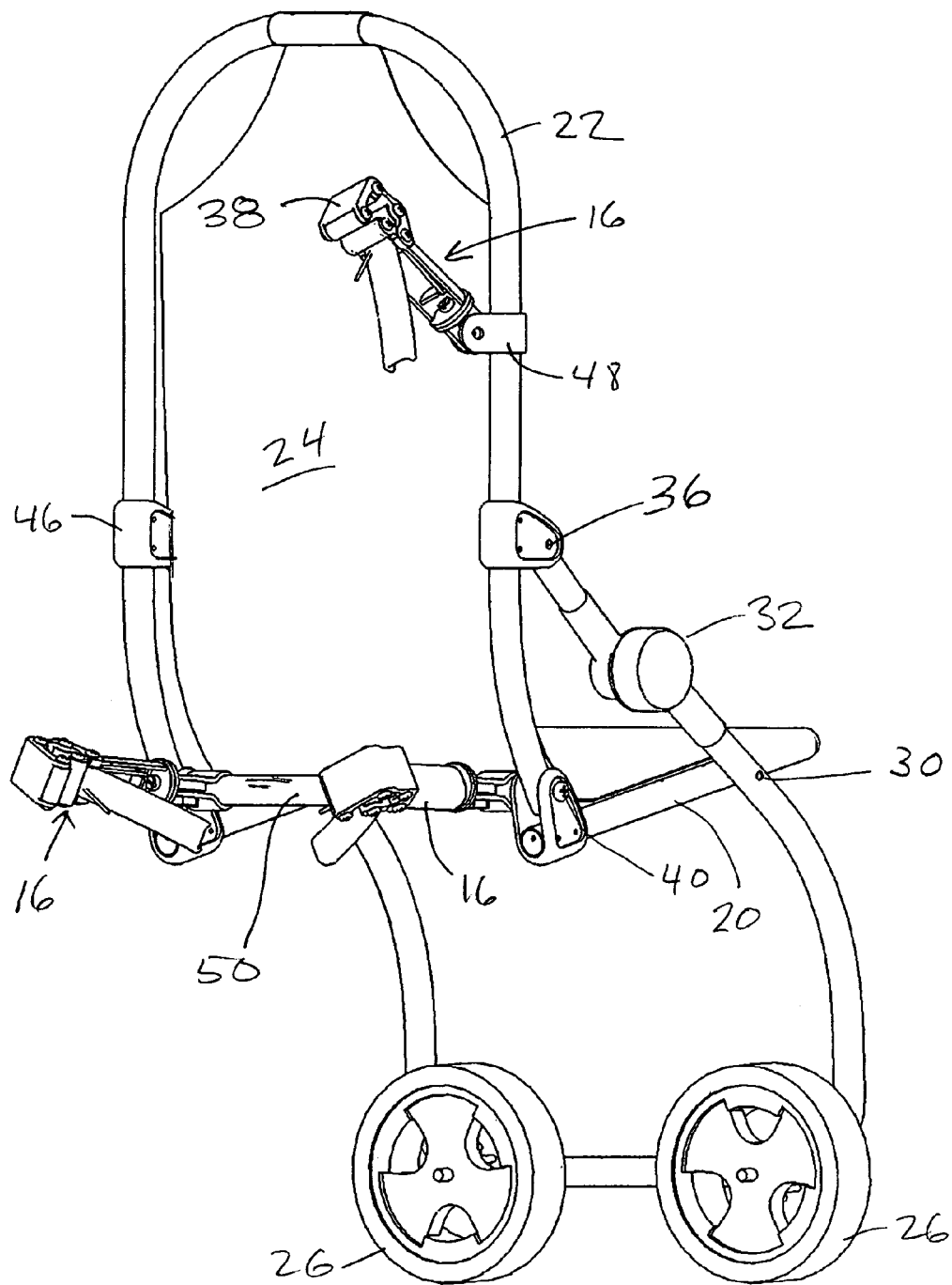
FIG. 4 is a perspective view showing the rear of the deployed auxiliary side seat, again without a stroller attached.

The side facing second-child seat frame has four pivot axes which enable it to be stowed compactly, from the position shown in FIGS. 1-4. Referring FIGS. 1-4, the first horizontal axis 40 is provided for upward swinging/pivoting of the seat bottom frame 20 to a position against the seat back frame 22. The second horizontal pivot axis 30 is formed where the lower portion 28 of the frame connects to the seat bottom frame 20. The lockable joints 32, which are quick-release joints, define a third horizontal pivot axis, and a fourth horizontal pivot axis 36 is formed at the point where the short linkage arms 34 connect to the seat back frame 22, which is preferably via a fixed bracket 46 as shown. FIG. 3 also shows the angularly-adjustable connectors 16 in somewhat greater detail, each being secured to the tubular auxiliary chair frame 18 by any appropriate form of connection, here shown as clamps 48 of the type commonly used to engage over tubular members. The engagement of these clamps 48 onto the side seat frame 18 is better seen in FIG. 4, a view from the rear of the deployed side chair, also showing a rear bar 50 preferably forming a part of the seat back frame 22 and on which two of the connectors 16 preferably are clamped or otherwise secured.

Figure 5:
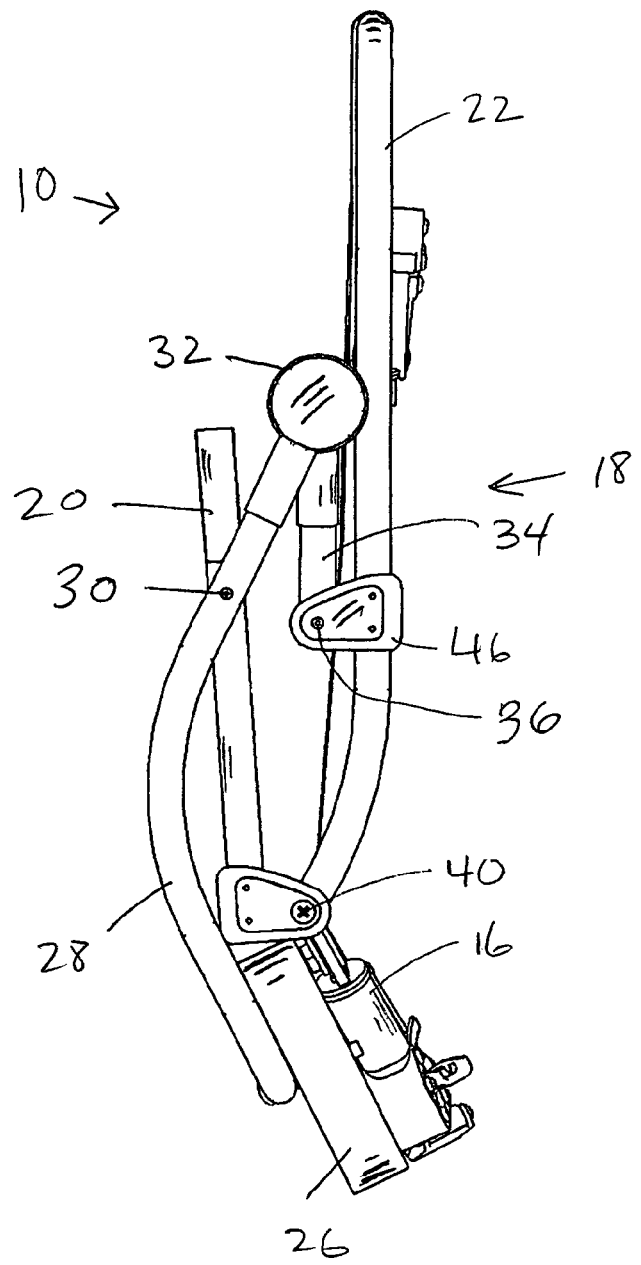
FIG. 5 is an elevation view in profile showing the auxiliary child seat in stowed configuration.
Figure 6:
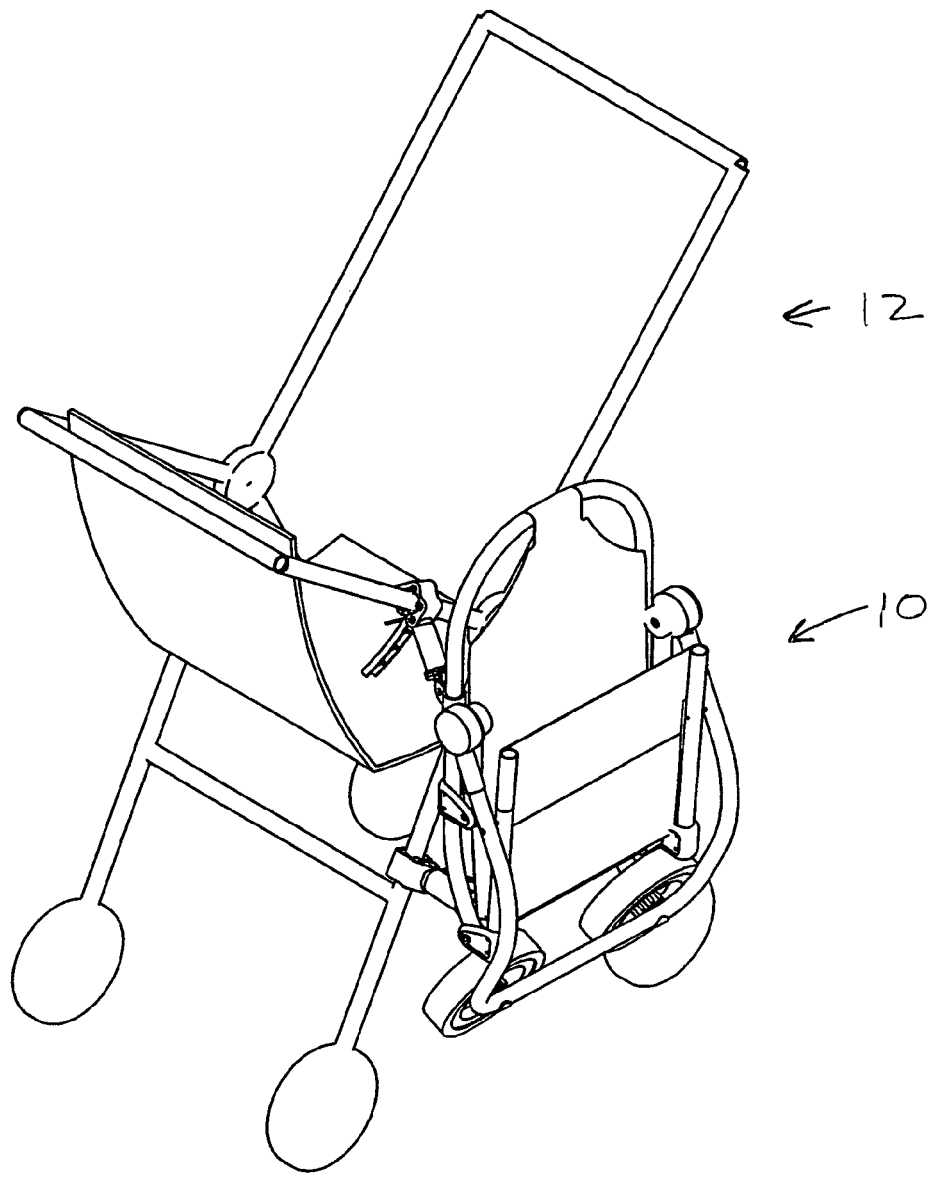
FIG. 6 is a perspective view of the stowed side seat as attached to a stroller, shown schematically.

The seat is moved toward the stowed position by releasing the lockable joints 32 (as explained further below), then lifting these two joints to swing them upwardly along with the short linkage arms 34. This causes the seat bottom frame 20 to swing upwardly about the axis 40, and the lower frame portion 28 to swing counterclockwise, as seen in FIG. 3, relative to the seat bottom frame about the horizontal axis 30, so that the seat bottom frame with the wheels 26 moves upwardly in a somewhat complex motion to arrive at the stowed configuration shown in FIG. 5. FIG. 6 shows the stowed side seat on a stroller 12.

Figure 7:
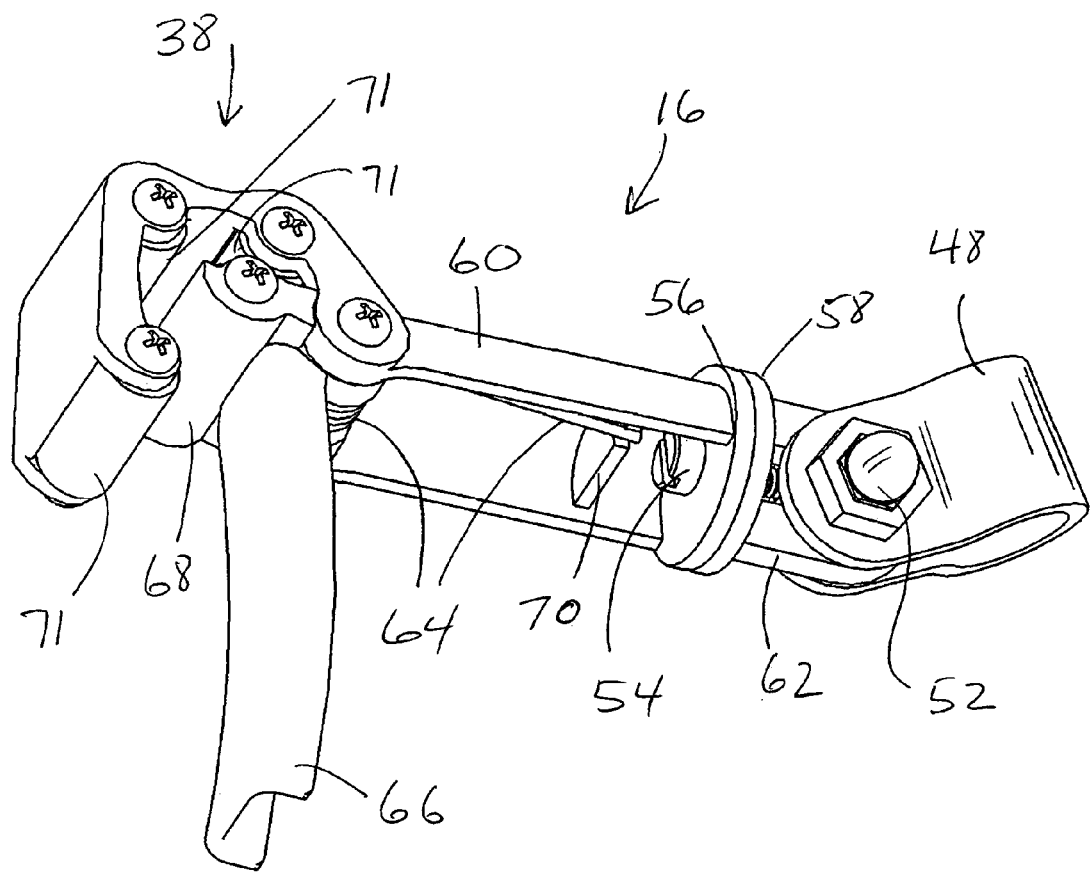
FIG. 7 is a perspective view showing a connector device in a preferred configuration, for attaching the auxiliary child seat to a stroller.

FIGS. 7-10 show preferred forms of connector 16, 16a according to the invention, in greater detail. As noted above, the connector 16 in the embodiment shown connects to the side seat of the invention using a tube clamp 48, as a base end of the connector. Other means of connection can be employed. The tube clamp 48 tightens onto the frame of the side seat via a bolt 52, which can be loosened and then re-tightened to establish one degree of rotation, which is rotation about the tubular frame member itself. Another degree of rotation is about the bolt 52, whereby the body of the connector swings up or down as seen in FIG. 7. Further, a rotation is provided about another bolt 54, which secures two circular plates 56 and 58 together. The plate 56 is fixed to a body or shaft 60 of the connector 16, while the plate 58 is fixed to or integral with a base 62 which is engaged by the bolt 52. When the machine bolt 54 is loosened it permits relative rotation between the circular plates 56 and 58; when it is tightened (preferably via a threaded hole in the lower plate 58, not shown), this fixes the two plates together.

Thus, the head or gripping end 38 of the connector can be universally adjusted as to orientation and position, via the three degrees of rotation explained above. Using these adjustments, one can swing the body or shaft 60 with head 38 to reach an appropriate portion of a main stroller frame member, and can then rotate the head to orient it appropriately for gripping onto the frame member. If necessary the clamp 48 (when loosened) allows for linear sliding adjustment of the connector 16 along the second seat frame member, although this typically is not needed.

The operation of the connector device 16 is simple. A coil or torsion spring 64 seen in FIG. 7 strongly biases a lever 66 and connected gripper bar 68 toward a closed position shown in FIG. 7. One end of the spring is braced against a cross bar 70 in the bar or shaft 60, while the other end (not shown) engages against the lever 66 or the gripping bar 68, very firmly urging the gripping bar toward the closed position. The gripping bar is retracted into an opened position by use of the lever 66. The connector is held in this open position (not shown) to engage over a tubular stroller frame member, whether round square or otherwise. A series of preferably cylindrical engagement bars 71, of which there may be three on parallel axes, are positioned such that typically (but not always) two of them will engage the frame member, in various configurations. When the lever 66 is allowed to return via the torsion spring, the gripping bar 68 closes against the frame member to grip the connector head 38 firmly over the frame member. All of the bars 68 and 71 can be cylindrical rubber contacts, as illustrated, to better effect a stable seating of a stroller frame member in the grip of the connector device. In some cases a side of the stroller frame member may be engaged against a fixed surface in the gripping head 38, between rubber cylinders. Materials similar to rubber may be used.

Figure 8:
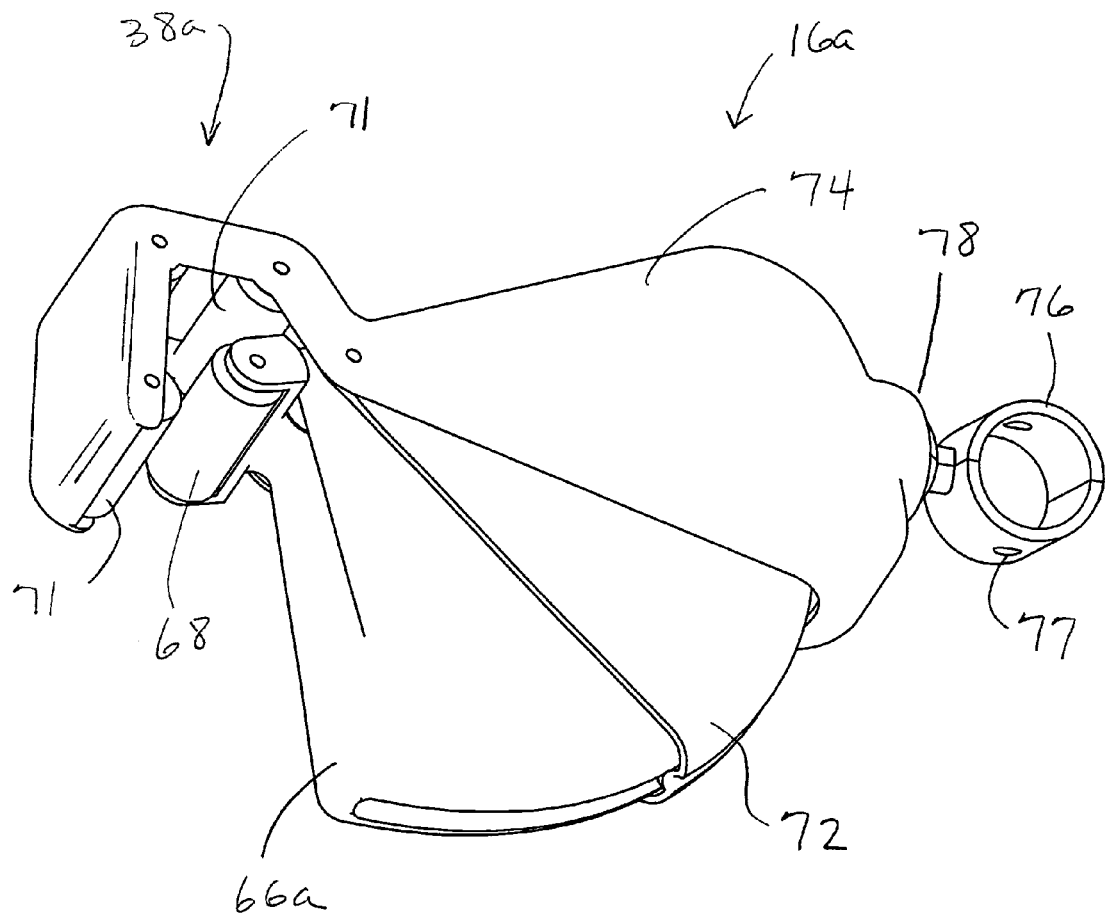
FIG. 8 is a view similar to FIG. 7, but showing a modified form of connector device.
Figure 9:
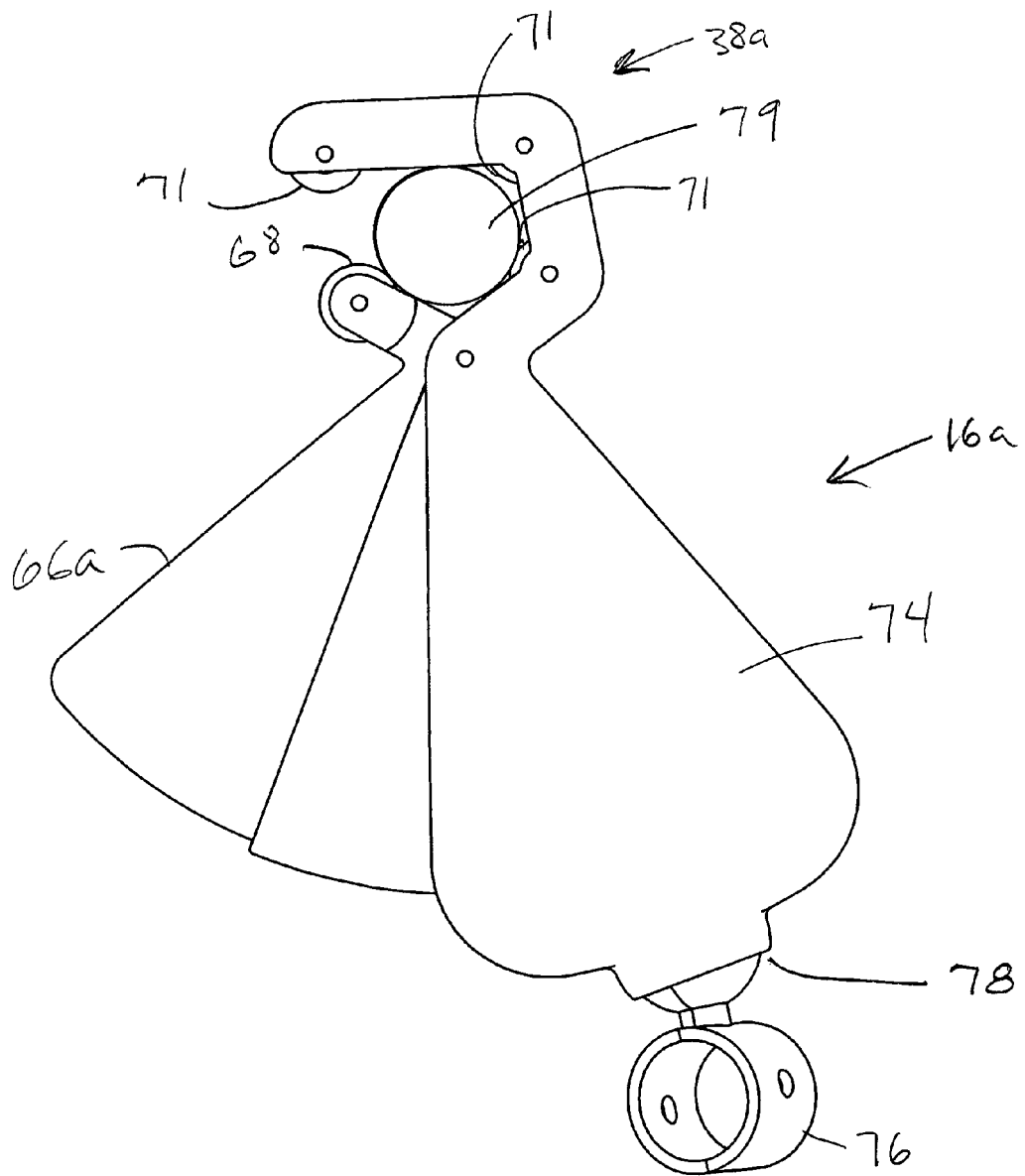
FIG. 9 is a view of the connector of FIG. 8 shown gripping a stroller frame member.
Figure 10:
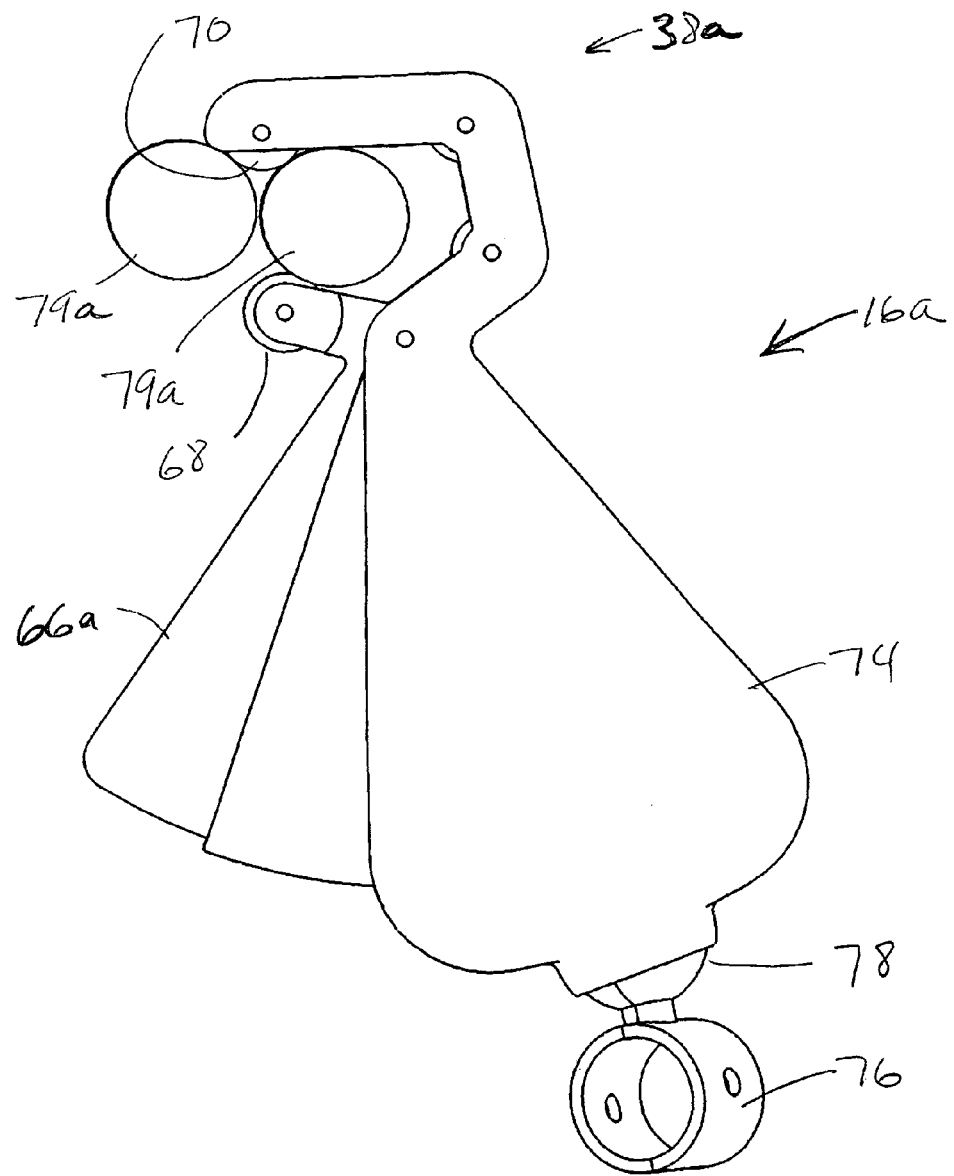
FIG. 10 is a view similar to FIG. 9 but showing a different type of stroller frame member.

FIGS. 8-10 show another form of connector device 16a which operates in the same manner as the connector 16 of FIG. 7 but with some differences in structure. A strong torsion spring urges the clamping bar or roller 68 toward a closed, gripping position. The spring is not seen in these figures. Bars or rollers 71 are mounted in the gripping head 38a, and the movable gripping bar or roller 68 is urged toward these other bars as shown.

A lever 66a in this embodiment is functionally the same as the lever 66 in FIG. 7, but styled differently, with a depth and with a further retractable sheath 72 which, along with the lever 66a, retracts into a housing or casing 74 in a manner to prevent pinching of fingers or hands. In this embodiment, instead of a tube clamp 48 as in FIG. 7, a simpler gripping ring 76 is provided, and this is to be affixed permanently onto the side seat of the invention, which can be via one or two fasteners passing through holes 77. Another difference from the previously described connector device is that a ball joint is provided at 78 between the attachment ring 76 and the connector device casing 74, allowing for rotation and universal swinging movement.

FIG. 9 shows the connector device 16a gripping a relatively large frame member 79 of a baby stroller. This tubing frame member 79 can be even slightly larger than shown. The gripper bar 68 bears against the stroller member 79, as does one of the bars or rollers 71 in the gripper head 38a. As indicated, one side of the tubing frame member 79 simply bears against the gripper head, between bars. Smaller round bars, or square bars in various sizes, can be accommodated by the gripper head. A relatively large square bar, for example (not shown), might engage one flat side between the two bars or rollers 71 shown at the top in FIG. 9, with the gripper bar 68 engaging against an outside lower corner of the square bar. A smaller square bar would fit more deeply into the gripping head, engaging against or between the two bars or rollers 71 at the deepest position in the gripper head.

FIG. 10 shows the connector device 16a in engagement with one bar 79a of a double round frame member formed of two such round bars 79a. One bar or roller 71 on the gripper head engages between and against both round bars 79a, while the spring-loaded gripper bar 68 pushes up and inwardly against the one round bar 79a, retaining the connector onto the frame. In this case the fixed gripper head structure 38a is shown bearing against the gripped round bar 79a.

The connector 16 or 16a is useful to connect other devices or items of equipment together when a secure but releasable connection is needed. For example, other accessories can be connected to a stroller, particularly carriers or storage devices having a tubular frame or element on which the clamp or collar 48 or 76 (or a clamp or collar of another shape) can be engaged.

Figure 11:
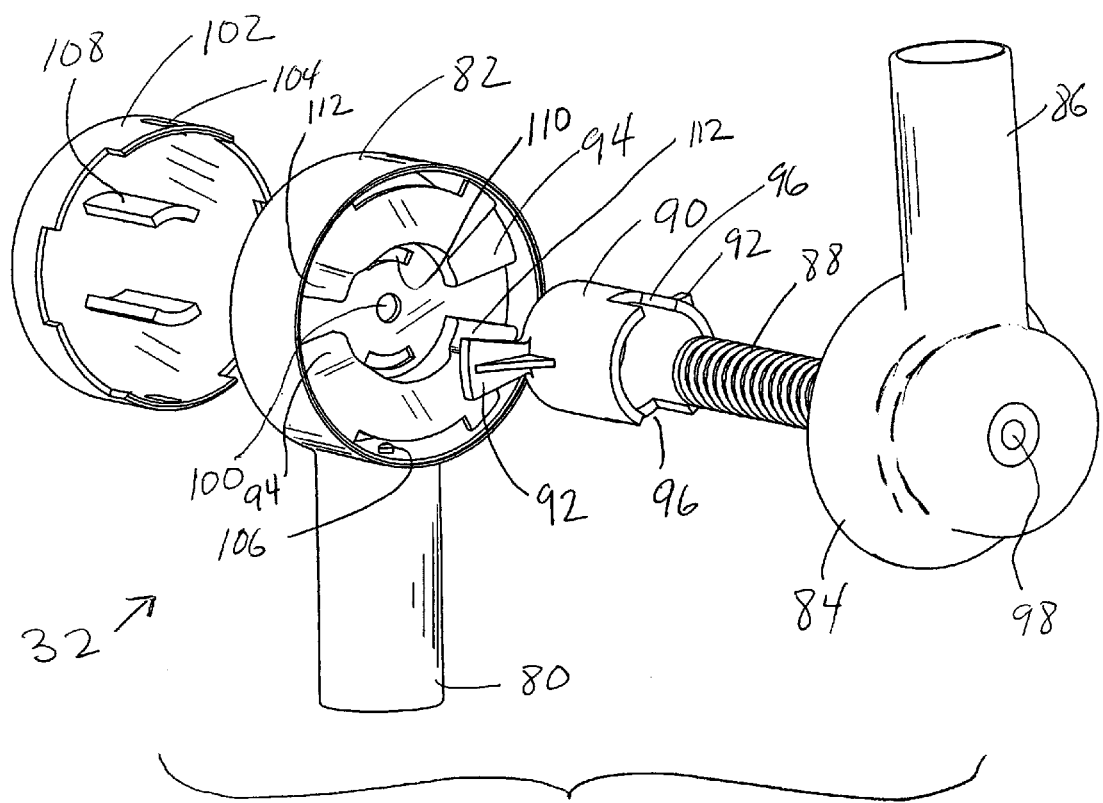
FIG. 11 is an exploded perspective view showing a preferred construction of a releasable locking joint.

FIG. 11 shows in detail, in an exploded view, a preferred form of the lockable joint 32 in accordance with the invention. In this preferred form, the lockable joint has a lower tubular sleeve 80 that fixes to the upper end of the auxiliary seat's lower frame portion 28, integral with a circular housing 82 as shown. This connects, when the joint is assembled together, with a hub 84 that has a tubular sleeve 86 extending up for securement to the short linkage arm 34 (FIG. 1). The hub and sleeve 84, 86 preferably are integrally formed. A compression spring 88 extends out from the hub 84 to engage with a position locking clip 90, pushing it against the interior of the housing 82. Within the housing 82 are several recesses for locking positions of the housing 82 rotationally with respect to the hub 84. One position is defined with prongs 92 of the clip 90 engaged in recesses 94 in the housing, and this can be assumed to be the deployed position of the joint shown in FIGS. 1-4. When the components are assembled, notches 96 of the clip 90 are engaged in fixed structure (not shown) within the hub 84 to lock the clip 90 rotationally permanently in position. The housing 82, however, is subject to rotation relative to the hub 84 and clip 90. When the housing and hub are retained together by a bolt (not shown) extending through holes 98 and 100, the prongs 92 are held in the notches 94 and the housing 82 cannot be rotated relative to the hub 84. However, the clip 90 is retractable against the force of the compression spring 88, with the notches 96 in the clip being deep enough to lock the clip 90 rotationally in all positions of axial displacement. When this clip 90 is pushed back (toward the hub 84 in FIG. 11), it can be displaced sufficiently that the prongs 92 clear the notches 94 and the housing 82 can be rotated, to allow the auxiliary seat to be moved to the stowed position shown in FIG. 5. This displacement of the clip 90 is effected using a housing cap 102 which snaps onto the housing, preferably residing in the outer diameter of the housing, and this may be via openings or recesses 104 that snap onto nipple bosses 106 within the housing shell 82, one of which can be seen in the lower part of the housing 82. The cap includes pusher stems 108 that extend through housing holes 110 to engage against the end of the spring-biased clip 90. The cap 102 acts as an external button and when pushed in, displaces the clip 90 enough to enable rotation of the housing 82.

In a preferred form the locking joint 32 also includes a rotation lock for the stowed position. The stowed position uses notches or recesses 112 as seen in FIG. 11.

The positions of the tubular connector sleeves 80 and 86 in FIG. 11 can be reversed, such that the sleeve 80 is above and connected to the short linkage arm 34, if desired, and the lockable joints can be reversed as to orientation of the release cap 102 (inward or outward), but the orientation illustrated in FIGS. 1-4 is preferred, with the linkage arms 34 slightly inward relative to the lower frame section 28 (see FIGS. 1 and 4) so as to provide a form of armrest.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. An optionally deployable side seat for a baby stroller to seat a second child, comprising:
    a frame including a seat bottom frame and a seat back frame and supporting a seat and back having a direction of child orientation, and at least one wheel supported for rotation on a lower portion of the frame and positioned, when the side seat is deployed, to contact a surface on which a baby stroller rolls, the wheel having a rolling axis generally aligned with said direction of child orientation such that the wheel rolls and advances in a movement direction perpendicular to the direction of child orientation,
    the frame having a plurality of releasable connectors extending back from a rear side of the frame and capable of securing to frame members on one side of a baby stroller, such that said direction of child orientation of the side seat is toward the one side and perpendicular to said movement direction, and
    the frame being capable of folding to a stowed configuration, having a first horizontal pivot axis at which the seat bottom frame is connected to the seat back frame such that the seat bottom frame folds up against the seat back frame for stowing, and said lower portion of the frame being pivotally connected, on a second horizontal pivot axis, to the seat bottom frame and extending downward from the seat bottom frame, with a means for retaining the lower portion of the frame in the deployed position.

2. The side seat of claim 1, wherein the frame includes three said releasable connectors.

3. The side seat of claim 1, wherein each releasable connector includes a base end secured to the frame of the side seat and a stroller attachment end configured to grip a frame member of a stroller, with a lever on the connector which when moved to a locking position will lock the connector onto a frame member of a stroller.

4. The side seat of claim 1, wherein each releasable connector has a base end secured to the frame of the side seat and a shaft leading to a stroller gripping end, the connector having provision for angular adjustment in orientation from the side seat frame and for rotational adjustment of the stroller gripping end relative to the base end.

5. The side seat of claim 1, wherein each releasable connector has a stroller gripping end that includes a tubing gripping head with a spring-biased gripper which is quickly releasable with a hand-operated lever.

6. The side seat of claim 5, wherein the gripping head includes three contacts of resilient material positioned to partially surround a tubing frame member of a stroller, the spring-biased gripper comprising a movable resilient contact pivotally mounted on the releasable connector to swing with spring bias toward the three contacts so as to enclose and grip a tubing frame member in the gripping head.

7. The side seat of claim 1, wherein two said wheels are included, both supported on the lower portion of the frame in tandem positions.

8. The side seat of claim 1, wherein the lower portion of the frame is generally U-shaped.

9. The side seat of claim 8, wherein two said wheels are included, both supported on the U-shaped lower portion of the frame in tandem positions.

10. The side seat of claim 1, wherein the lower portion of the frame extends upwardly beyond said second horizontal pivot axis to a pair of quick-release lockable joints at each of two ends of the lower frame portion, defining a third horizontal pivot axis at said lockable joints, and including two short linkage arms, one extending from each lockable joint upwardly and back, when the side seat is deployed, to a connection with the seat back frame defining a fourth horizontal pivot axis, such that for stowing the side seat, each of the lockable joints is released and swung upwardly with the short linkage arms, causing the seat bottom frame to pivot upwardly along the first horizontal pivot axis while raising the lower frame portion upwardly and swinging the wheel inwardly to stowed configuration, said quick-release lockable joints serving as said means for retaining the lower portion of the frame in the deployed position.

11. The side seat of claim 10, wherein the lower frame portion is generally U-shaped.

12. The side seat of claim 11, wherein the locking mechanism includes two locking positions, one at deployment of the side seat and one at stowing of the side seat.

13. The side seat of claim 10, wherein each lockable joint includes a spring-biased locking mechanism, with an external push button effective to release the locking mechanism.

14. The side seat of claim 1, wherein the seat back frame is generally inverted U-shaped, and wherein the seat and back supported by said seat bottom frame and back frame are flexible.

* * * * *